(12) United States Patent
Kume et al.

(10) Patent No.: US 9,061,604 B2
(45) Date of Patent: Jun. 23, 2015

(54) VEHICLE SEAT SLIDE APPARATUS

(71) Applicant: AISIN SEIKI KABUSHIKI KAISHA, Kariya (JP)

(72) Inventors: Sho Kume, Kariya (JP); Tsutomu Oya, Kariya (JP); Hideki Fujisawa, Hekinan (JP)

(73) Assignee: AISIN SEIKi KABUSHIKI KAISHA, Kariya-shi (JP)

( * ) Notice: Subject to any disclaimer, the term of this patent is extended or adjusted under 35 U.S.C. 154(b) by 227 days.

(21) Appl. No.: 13/773,995

(22) Filed: Feb. 22, 2013

(65) Prior Publication Data

US 2013/0214113 A1     Aug. 22, 2013

(30) Foreign Application Priority Data

Feb. 22, 2012 (JP) ................................. 2012-036485

(51) Int. Cl.
*F16M 13/00* (2006.01)
*B60N 2/07* (2006.01)
*B60N 2/08* (2006.01)
*B60N 2/06* (2006.01)

(52) U.S. Cl.
CPC .. *B60N 2/07* (2013.01); *B60N 2/08* (2013.01); *B60N 2/0715* (2013.01); *B60N 2/065* (2013.01); *B60N 2/0727* (2013.01); *B60N 2/0818* (2013.01); *B60N 2/0843* (2013.01)

(58) Field of Classification Search
CPC ...... B60N 2/7015; B60N 2/0705; B60N 2/07; B60N 2/08; B60N 2/065; B60N 2/0727; B60N 2/0818; B60N 2/0843

USPC ............. 248/424, 429; 297/344.1; 296/65.01, 296/65.13

See application file for complete search history.

(56) References Cited

U.S. PATENT DOCUMENTS

| | | | | |
|---|---|---|---|---|
| 6,286,799 | B1 * | 9/2001 | Fujii | 248/430 |
| 7,665,703 | B2 * | 2/2010 | Tanaka | 248/429 |
| 8,196,888 | B2 * | 6/2012 | Yamada et al. | 248/429 |
| 2013/0161991 | A1 * | 6/2013 | Otsuka et al. | 297/344.21 |

FOREIGN PATENT DOCUMENTS

| | | |
|---|---|---|
| JP | 2005-22551 | 1/2005 |
| JP | 4631327 | 11/2010 |

* cited by examiner

*Primary Examiner* — Todd M Epps
(74) *Attorney, Agent, or Firm* — Oblon, McClelland, Maier & Neustadt, L.L.P.

(57) ABSTRACT

Provided is a slide door device for a vehicle seat slide apparatus including: a lower rail configured to be fixed to a vehicle floor; an upper rail configured to be fixed to a seat; a lock mechanism that selectively locks a movement of the upper rail at an arbitrary position of the upper rail with respect to the lower rail; a stopper mechanism that has a stopper portion provided in the lower rail and a stopper member movably provided in the upper rail; an operation member that allows the movement of the upper rail, which is locked at the predetermined position, in the one direction by inputting an operation force for releasing to the stopper member; and a guide portion that is formed on the stopper member, and guides the stopper member so as to release the engagement between the stopper member and the stopper portion.

4 Claims, 5 Drawing Sheets

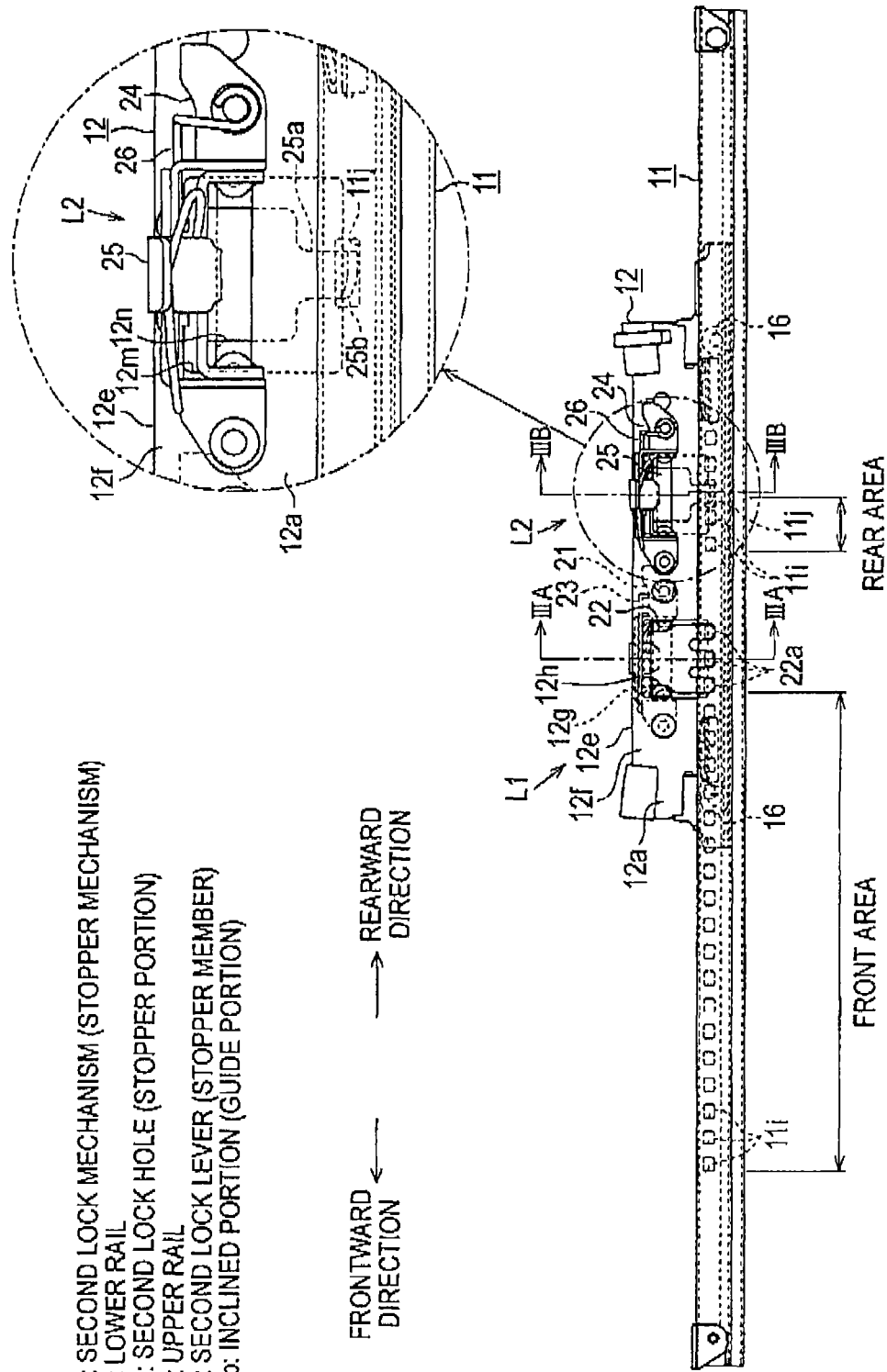

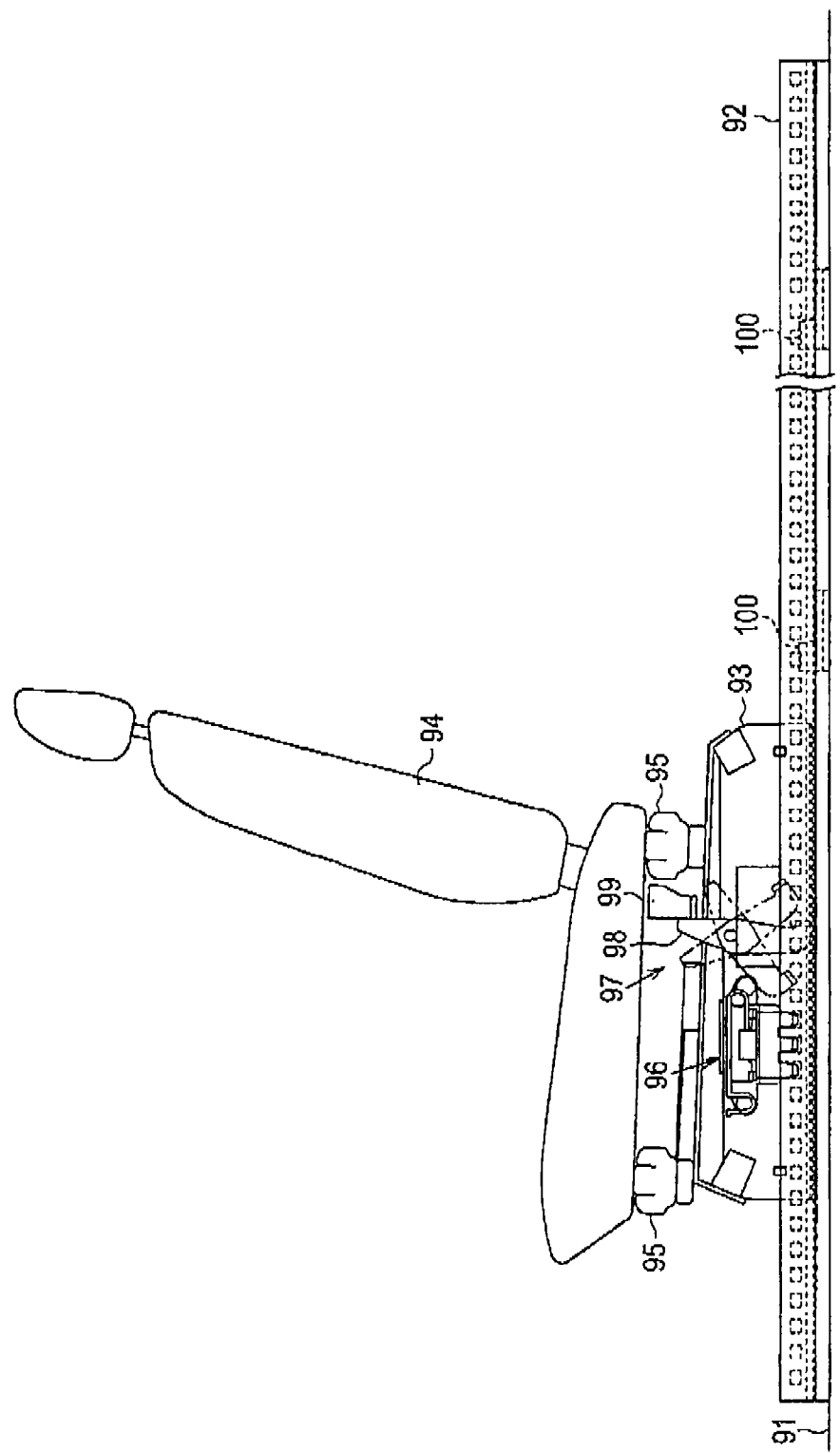

VEHICLE SEAT SLIDE APPARATUS

CROSS REFERENCE TO RELATED APPLICATIONS

This application is based on and claims priority under 35 U.S.C. §119 to Japanese Patent Application 2012-36485, filed on Feb. 22, 2012, the entire content of which is incorporated herein by reference.

TECHNICAL FIELD

This disclosure relates to a vehicle seat slide apparatus.

BACKGROUND DISCUSSION

An apparatus disclosed in, for example, Japanese Patent No. 4631327 (Reference 1) has been known as a vehicle seat slide apparatus. As shown in FIG. 5, the apparatus includes a lower rail 92 which is fixed to a vehicle floor 91 and extends along a front-rear direction, an upper rail 93 which is slidably mounted to the lower rail 92, a lateral slide rail 95 which is provided in the upper portion of the upper rail 93 in a vehicle width direction and slidably supports a seat 94, a first lock mechanism 96 capable of fixing the upper rail 93 to an arbitrary position of the lower rail 92, and a second lock mechanism 97 which selectively restricts a movement of the upper rail 93 in a rearward direction from a predetermined position. When the seat 94 is within a predetermined range in the vehicle width direction, the second lock mechanism 97 restricts the movement of the upper rail 93 in the rearward direction from the predetermined position by locking a stopper unit 98 to a bracket 100 fixed and mounted to the lower rail 92 in a locked state with a stopper bracket 99 where the stopper unit 98 rotatably supported to the upper rail 93 is held in an upright position by the stopper bracket 99 fixed to the seat 94.

Moreover, if the seat 94 is moved in the vehicle width direction by the lateral slide rail 95, the second lock mechanism 97 allows the movement of the upper rail 93 in the rearward direction from the predetermined position by releasing the locked state between the stopper unit 98 and the stopper bracket 99.

That is, in the case where the seat 94 is within the predetermined range in the vehicle width direction, when the upper rail 93 (seat 94) is moved in the rearward direction, it is possible that the upper rail 93 is temporarily stopped at the predetermined position and then moved in the rearward direction further than the predetermined position. Thus, particularly when the upper rail 93 is moved widely, it is possible to reduce the movement speed of the upper rail 93. Thereby, it can be prevented that the seat 94 hits peripheral equipment such as a wheel house with a large impact force.

Meanwhile, In the Reference 1, the restriction or release of the movement of the upper rail 93 in the rearward direction from the predetermined position due to the engagement or disengagement between the stopper unit 98 and the stopper bracket 99 of the second lock mechanism 97 is switched corresponding to the position of the seat 94 in the vehicle width direction. In other words, when the seat 94 is out of the predetermined range in the vehicle width direction in advance, the movement of the upper rail 93 in the rearward direction from the predetermined position is always allowed. However, demands related to a positional adjustment of the seat 94 or the like are various. As an example of the demands, a user may want to always restrict the movement of the upper rail 93 with respect to the lower rail 92 at a predetermined position within a movable range of the upper rail 93. Specifically, in the seat which is slidable between the first row and the second row of the rear-seat compartment, when moving the seat from a front area, namely the first row, to a rear area, namely the second row, there may be a case of temporarily stopping the seat at a boundary position between the front area and the rear area in order to allow a user to recognize the change of the area. Alternatively, when moving the seat from a seating area to a non-seating area (luggage compartment area, for example), there may be a case of temporarily stopping a seat body at the boundary position between the seating area and the non-seating area in order to allow a user to recognize the change of the area.

Meanwhile, even in the case where the seat is temporarily stopped at the boundary position between both areas, or the like, if a user returns the seat to the original area where the seat was located before being moved toward the boundary position, or the like, it is preferable to release the movement restriction of the upper rail by a simple operation because the change of area between both areas practically does not occur. That is, if, for example, the release operation of an operation lever is required to release the movement restriction of the upper rail at the boundary position between both areas, or the like, there is a possibility that the operationality may be deteriorated.

A need thus exists for a vehicle seat slide apparatus which is not susceptible to the drawback mentioned above.

SUMMARY

In order to solve the above-mentioned problem, according to an aspect of this disclosure, there is provided a vehicle seat slide apparatus including: a lower rail configured to be fixed to a vehicle floor; an upper rail configured to be fixed to a seat and slidably connected with the lower rail; a lock mechanism that selectively locks a movement of the upper rail at an arbitrary position of the upper rail with respect to the lower rail; a stopper mechanism that has a stopper portion provided in the lower rail and a stopper member movably provided in the upper rail, and locks the movement of the upper rail toward a predetermined position in one direction by making the stopper member and the stopper portion engage with each other at the predetermined position of the upper rail with respect to the lower rail; an operation member that allows the movement of the upper rail, which is locked at the predetermined position, in the one direction by inputting an operation force for releasing to the stopper member; and a guide portion that is formed on the stopper member, and guides the stopper member so as to release the engagement between the stopper member and the stopper portion in response to the movement of the upper rail, which is locked at the predetermined position, in an opposite direction of the one direction.

BRIEF DESCRIPTION OF THE DRAWINGS

The foregoing and additional features and characteristics of this disclosure will become more apparent from the following detailed description considered with the reference to the accompanying drawings, wherein:

FIG. 2 is a side view and an enlarged view illustrating an embodiment disclosed here;

FIG. 5 is a side view illustrating a conventional apparatus.

DETAILED DESCRIPTION

An embodiment disclosed here will be explained with reference to FIGS. 1 to 4.

Figure 1:
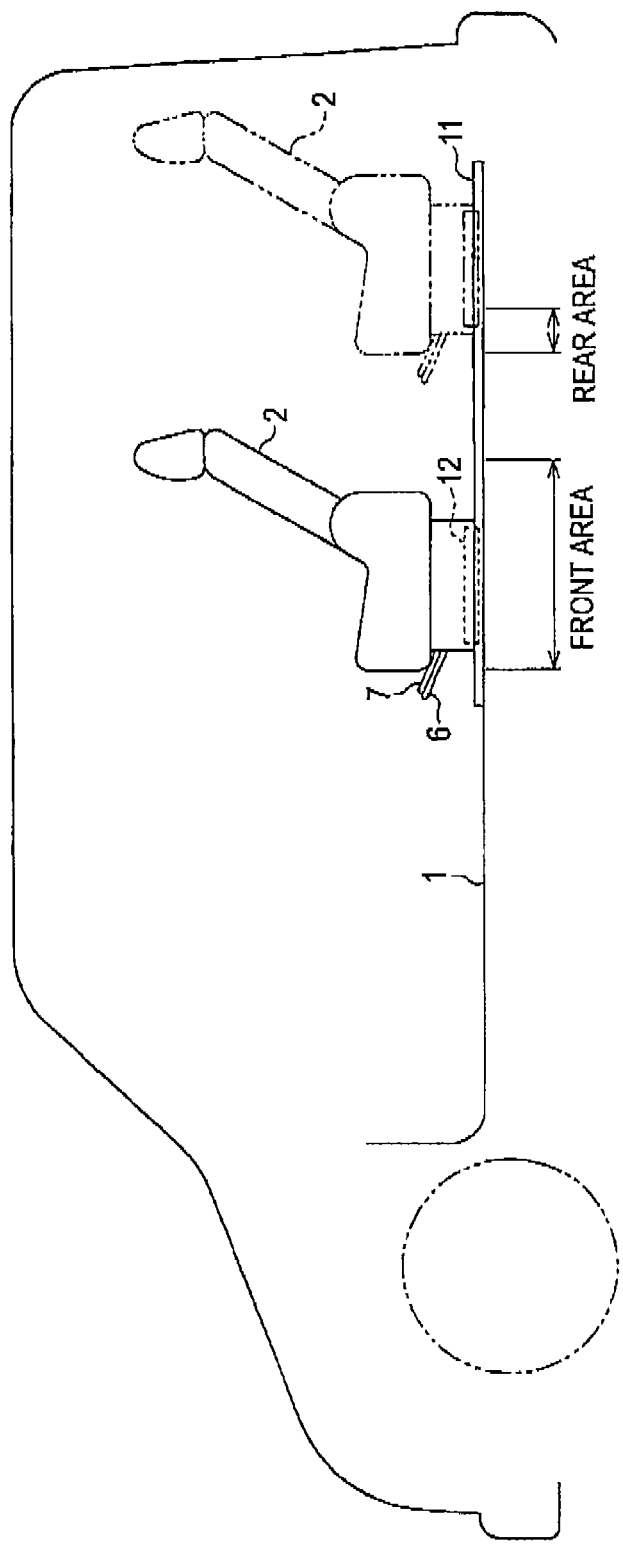
FIG. 1 is a side view illustrating a vehicle seat according to an embodiment disclosed here.

As shown in FIG. 1, in a rear-seat compartment of a three-row seat vehicle such as a one-box vehicle or a minivan, a lower rail 11 made of a steel plate is fixed on a vehicle floor 1 in a manner of extending in a front-rear direction and an upper rail 12 made of a steel plate is mounted to the lower rail 11 so as to be relatively slidable in the front-rear direction with respect to the lower rail 11. A relative position between the lower rail 11 and the upper rail 12 is divided into a front area, as a first area, which is a front-rear positional adjustment area of a first-row rear seat (that is, a second-row seat of the three-row seat) and a rear area, as a second area, which is the front-rear positional adjustment area of a second-row rear seat (that is, a third-row seat of the three-row seat).

In addition, each of the lower rail 11 and the upper rail 12 is arranged in pairs in a width direction (direction perpendicular to the sheet in FIG. 1), and the one, which is disposed on a left side as viewed longitudinally toward the frontward, is illustrated in the figures. Furthermore, seats 2 which form a seating portion for a passenger are respectively fixed to and supported on both upper rails 12. Thus, the seat 2 can be used both as a first-row seat of the rear-seat compartment, which can be positionally adjusted in the front area, and a second-row seat of the rear-seat compartment, which can be positionally adjusted in the rear area. The relative movement between the lower rail 11 and the upper rail 12 is basically in a locking state, and a first releasing handle 6 and a second releasing handle 7 are provided to release the locking state.

Figure 3A:
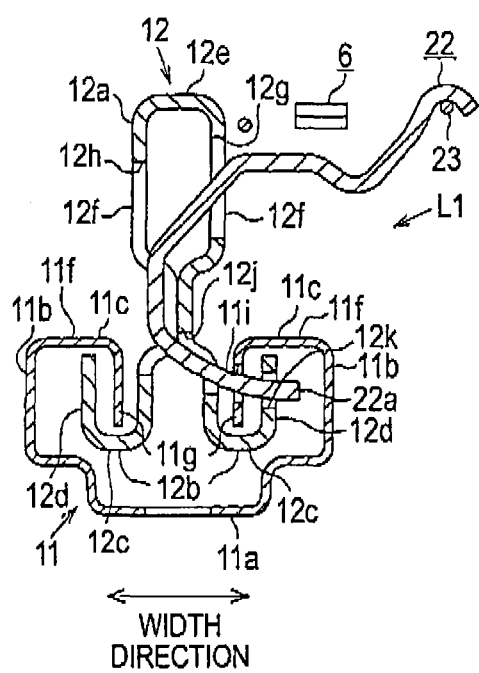
FIG. 3A is a cross-sectional view taken IIIA-IIIA line in FIG. 2.
Figure 3B:
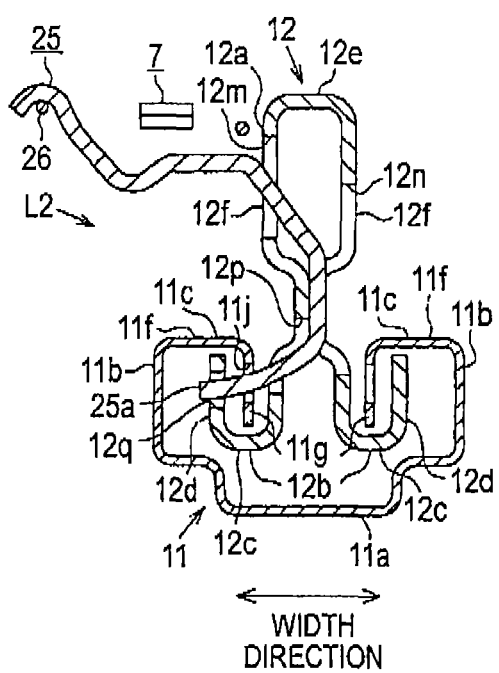
FIG. 3B is a cross-sectional view taken IIIB-IIIB line in FIG. 2.

As shown in FIGS. 3A and 3B, the lower rail 11 has a bottom wall portion 11a extending in the front-rear direction, two side wall portions 11b which are respectively provided at both ends of the bottom wall portion 11a in a width direction and extend in a vertical direction, and two lower rail hook portions 11c which are respectively formed at the top ends of two side wall portions 11b. In addition, both lower rail hook portions 11c respectively have inward extending portions 11f which extend toward an inner side (side where the inward extending portions 11f face each other) in the width direction and downward extending portions 11g which extend in a downward direction from the tip ends of the inward extending portions 11f.

As shown in FIG. 3A, a first lock hole 11i having a substantially square shape is formed on the downward extending portion 11g on one side (right side in FIG. 3A) of the lower rail hook portions 11c. As shown in FIG. 2, in the front area and the rear area, a plurality of the first lock holes 11i are formed on a longitudinal direction (front-rear direction) with a predetermined interval. Incidentally, the first lock hole 11i is not formed on a boundary portion between the front area and the rear area.

As shown in FIG. 3B, a second lock hole 11j having a substantially square shape is formed, as a stopper portion, in the downward extending portion 11g on an opposite side (left side in FIG. 3B) of the lower rail hook portions 11c. As shown in FIG. 2, the second lock hole 11j is formed on a predetermined position which is the boundary portion between the front area and the rear area. In addition, although the second lock hole 11j is disposed at the position overlapping with the first lock hole 11i in the longitudinal direction of the lower rail 11, the disposition thereof is not hindered because both lock holes are respectively disposed on the different sides in the width direction. In the longitudinal direction of the lower rail 11, the open width of the second lock hole 11j is set to be larger than the open width of the first lock hole 11i.

Meanwhile, as shown in FIGS. 3A and 3B, the upper rail 12 has a body wall portion 12a which is disposed between the pair of lower rail hook portions 11c and upper rail hook portions 12b which are respectively formed at lower ends of the body wall portion 12a so as to extend toward an outer side in the width direction. In addition, the body wall portion 12a has a top plate portion 12e extending in the width direction and a pair of mounting portions 12f extending in the downward direction from both ends of the top plate portion 12e in the width direction. Both mounting portions 12f close toward the inner side in the width direction so as to abut against each other at the middle portion thereof in an up-down direction. Also, both mounting portions 12f open toward the outer side in the width direction so as to be spaced apart from each other on a lower side of the abutment portion. In other words, the body wall portion 12a has a closed cross-sectional structure having a substantially square shape at the upper portion thereof. Furthermore, the upper rail hook portions 12b have outward extending portions 12c which extend toward the outside (side where the outward extending portions 12c are spaced apart from each other) at lower ends of the body wall portion 12a opening in the width direction and upward extending portions 12d which extend in an upward direction from tip ends of the outward extending portions 12c. Since the outward extending portion 12c is disposed below (with a slight gap) the downward extending portion 11g and the upward extending portion 12d faces the downward extending portion 11g in the width direction, the upper rail hook portion 12b is engageable with respect to the lower rail hook portion 11c in the upward direction and the width direction. Thereby, the upper rail hook portion 12b is prevented from being disengaged from the lower rail hook portion 11c.

In addition, as shown in FIG. 2, a pair of rolling members 16 is provided in the upper rail 12 in the front-rear direction of the upper rail 12. The rolling members 16 keep a constant space with the lower rail 11 in the up-down direction and enable the upper rail 12 to move in the front-rear direction with respect to the lower rail 11. The rolling member 16 is rotatably supported with respect to the upward extending portion 12d and is rollable on the lower rail 11, thereby enabling the upper rail 12 to move (travel) in the front-rear direction.

In the meantime, a first support bracket 21 is fastened to the mounting portion 12f on one side (back side perpendicular to the paper in FIG. 2) of the upper rail 12, and a first lock lever 22 is rotatably connected with the first support bracket 21. Specifically, as shown in FIG. 3A, in both mounting portions 12f of the upper rail 12, penetration holes 12g, 12h having a substantially square shape are respectively formed at the position equivalent to each other in the front-rear direction. Also, in a lower end portion of the mounting portion 12f on one side, which has the penetration hole 12g, a plurality (three) of insertion holes 12j are formed on the longitudinal direction (front-rear direction) with the predetermined interval. Furthermore, in the upward extending portion 12d on the one side, a plurality (three) of insertion holes 12k are formed on the longitudinal direction (front-rear direction) with the predetermined interval. In accordance with the disposition range of the penetration hole 12g in the front-rear direction, these insertion holes 12j, 12k are provided at the position equivalent to each other in the front-rear direction.

In addition, as shown in FIG. 2, the first support bracket 21 is bent so as to open the penetration hole 12g and extends its both end portion to both sides of the penetration hole 12g in the front-rear direction. Also, the first support bracket 21 is fastened and fixed to the mounting portion 12f (upper rail 12) on both end portion of the penetration hole 12g in the front-rear direction. Furthermore, the first lock lever 22 is connected with the first support bracket 21 so as to be rotatable around an axis extending in the front-rear direction (longitudinal direction of the upper rail 12). A plurality (three) of first lock claws 22a are arranged in a lower portion of the first lock lever 22 at the position corresponding to the insertion holes 12j, 12k in the front-rear direction.

As shown in FIG. 3A, the first lock lever 22 being sequentially inserted into the penetration holes 12g, 12h enables each first lock claw 22a penetrating the insertion hole 12j to be sequentially inserted into the first lock hole 11i and the insertion hole 12k in response to the rotation around the axis thereof. When the first lock claw 22a of the first lock lever 22 is inserted into the first lock hole 11i and the insertion hole 12k, the movement of the upper rail 12 with respect to the lower rail 11 is locked in the front area or the rear area. Thereby, the seat 2 supported on the upper rail 12 is positioned as well. On the other hand, when the first lock claw 22a is separated from the insertion hole 12k and the first lock hole 11i by the rotation of the first lock lever 22, the movement of the upper rail 12 (seat 2) with respect to the lower rail 11 is allowed. In the boundary portion between the front area and the rear area where the first lock hole 11i is not formed, a tip end of the first lock claw 22a abuts on the downward extending portion 11g, whereby the movement of the upper rail 12 with respect to the lower rail 11 is not able to be locked.

Also, as shown in FIG. 2, since one end of a torsion spring 23 is fixed to the first support bracket 21 and the other end is fixed to the first lock lever 22, the first lock lever 22 is always urged rotationally to the side where the first lock claw 22a is inserted into the first lock hole 11i and the insertion hole 12k, namely to the side where the movement of the upper rail 12 with respect to the lower rail 11 is locked. Furthermore, the first lock lever 22 is mechanically linked to the first releasing handle 6. As an external operation force for releasing is input through the first releasing handle 6, the first lock lever 22 is rotated to the side where the first lock claw 22a is disengaged from the insertion hole 12k and the first lock hole 11i against the urging force of the torsion spring 23, namely to the side where the movement of the upper rail 12 with respect to the lower rail 11 is allowed. The first lock lever 22, torsion spring 23, first lock hole 11i and the like constitute a first lock mechanism L1 as a lock mechanism.

Meanwhile, on a rear side of the first support bracket 21, a second support bracket 24 is fastened to the mounting portion 12f on the opposite side (front side perpendicular to the paper in FIG. 2) of the upper rail 12, and a second lock lever 25 is rotatably connected with the second support bracket 24, as a stopper member. Specifically, as shown in FIG. 3B, in both mounting portions 12f of the upper rail 12, penetration holes 12m, 12n having a substantially square shape are respectively formed at the position equivalent to each other in the front-rear direction. Also, in the lower end portion of the mounting portion 12f on one side, which has the penetration hole 12m, an insertion holes 12p is formed. In addition, an insertion hole 12q is formed on the upward extending portion 12d on the same side. In accordance with the disposition range of the penetration hole 12m in the front-rear direction, these insertion holes 12p, 12q are provided at the position equivalent to each other in the front-rear direction.

In addition, as shown in FIG. 2, the second support bracket 24 is bent so as to open the penetration hole 12m and extends its both end portion to both sides of the penetration hole 12m in the front-rear direction. Also, the second support bracket 24 is fastened and fixed to the mounting portion 12f (upper rail 12) on both end portion of the penetration hole 12m in the front-rear direction. Furthermore, the second lock lever 25 is connected with the second support bracket 24 so as to be rotatable around the axis extending in the front-rear direction (longitudinal direction of the upper rail 12). A second lock claw 25a is provided in a lower portion of the second lock lever 25 at the position corresponding to the insertion holes 12p, 12q in the front-rear direction. As shown in FIG. 3B, the second lock lever 25 being sequentially inserted into the penetration holes 12m, 12n enables the second lock claw 25a penetrating the insertion hole 12p to be sequentially inserted into the second lock hole 11j and the insertion hole 12q in response to the rotation around the axis thereof. When the second lock claw 25a of the second lock lever 25 is inserted into the second lock hole 11j and the insertion hole 12q, the movement of the upper rail 12 with respect to the lower rail 11 is locked in the predetermined position of the boundary portion between the front area or the rear area. On the other hand, when the second lock claw 25a is separated from the insertion hole 12q and the second lock hole 11j by the rotation of the second lock lever 25, the movement of the upper rail 12 (seat 2) with respect to the lower rail 11 is allowed. In a part of the front area, rear area and the like, where the second lock hole 11j is not formed, a tip end of the second lock claw 25a abuts on the downward extending portion 11g, whereby the movement of the upper rail 12 with respect to the lower rail 11 is not able to be locked.

Also, as shown in FIG. 2, since one end of a torsion spring 26 is fixed to the second support bracket 24 and the other end is fixed to the second lock lever 25, the second lock lever 25 is always urged rotationally to the side where the second lock claw 25a is inserted into the second lock hole 11j and the insertion hole 12q, namely to the side where the movement of the upper rail 12 with respect to the lower rail 11 is locked. Furthermore, the second lock lever 25 is mechanically linked to the second releasing handle 7. As the external operation force for releasing is input through the second releasing handle 7, the second lock lever 25 is rotated to the side where the second lock claw 25a is disengaged from the insertion hole 12q and the second lock hole 11j against the urging force of the torsion spring 26, namely to the side where the movement of the upper rail 12 with respect to the lower rail 11 is allowed. The second lock lever 25, torsion spring 26, second lock hole 11j and the like constitute a second lock mechanism L2 as a stopper mechanism.

Figure 4:
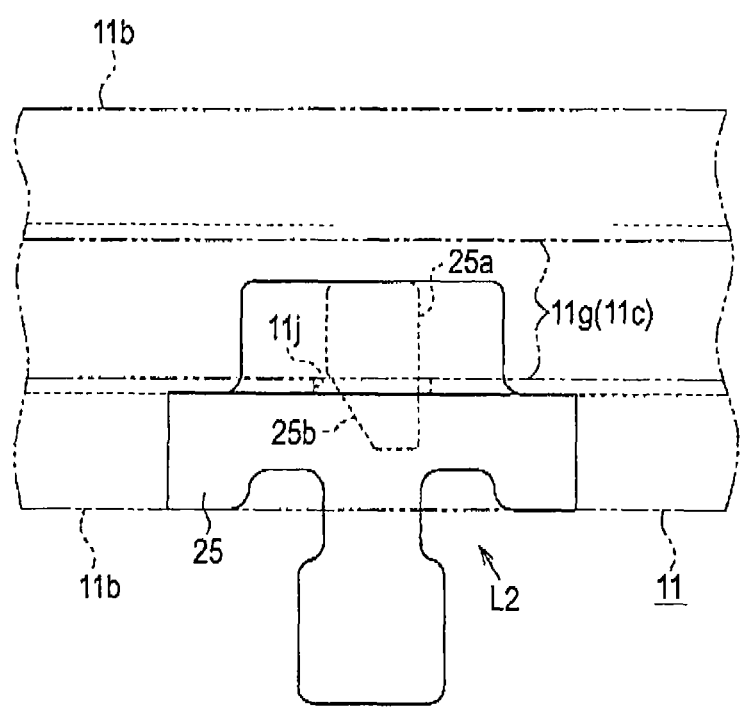
FIG. 4 is a plan view illustrating the embodiment.

Meanwhile, as shown in FIG. 4, in the second lock lever 25, an inclined portion 25b is formed on the tip end of the second lock claw 25a to be inserted into the second lock hole 11j, as a guide portion. The inclined portion 25b is disposed in the front portion of the second lock claw 25a. In a state of being inserted into the second lock hole 11j, the inclined portion 25b is inclined linearly so as to, as coming closer to the tip end, be headed in the rearward direction with the second lock hole 11j as a starting point thereof. Therefore, in a state where the second lock claw 25a is inserted into the second lock hole 11j, if the second lock lever 25 is moved in the frontward direction (namely, the front area) along with the upper rail 12, the inclined portion 25b is pressed by the second lock hole 11j. Thereby, the second lock lever 25 is guided by the inclined portion 25b such that the second lock claw 25a is disengaged from the second lock hole 11j. In other words, instead of an operation of the second releasing handle 7, an operation of moving the upper rail 12 (seat 2) in the frontward direction may be used as an operation for releasing the second lock lever 25. However, in a state where the second lock claw 25a is inserted into the second lock hole 11j, even if the second lock lever 25 tries to move in the rearward direction (namely, the rear area) along with the upper rail 12, it does not happen that the second lock claw 25a is disengaged from the second lock hole 11j.

In addition, for convenience, it is illustrated in FIG. 2 that, in a state where the second lock claw 25a of the second lock lever 25 is inserted into the second lock hole 11j, the first lock claw 22a of the first lock lever 22 is also inserted into the first lock hole 11i. However, the first lock lever 22 is practically not inserted into the first lock hole 11i because the tip end of the first lock claw 22a abuts on the downward extending portion 11g. Also, in the above-described aspect, when the second lock claw 25a is disengaged from the second lock hole 11j in response to the movement of the upper rail 12 (seat 2) in the frontward direction, it is configured such that the first lock claw 22a of the first lock lever 22 is immediately inserted into the first lock hole 11i.

Next, the operation of the embodiment will be explained.

First, circumstances in a state where a relative position between the lower rail 11 and the upper rail 12 is located at a predetermined front-side position in the front area, and where the operation of the first and second releasing handles 6, 7 is released together, whereby the movement of the upper rail 12 is locked at the predetermined front-side position by the first lock mechanism L1 (first lock lever 22 and the like) are considered. In this case, the second lock lever 25 urged by the torsion spring 26 is in a state where the tip end of the second lock claw 25a abuts on the downward extending portion 11g. In this state, if the first releasing handle 6 is operated, the first lock lever 22 is rotated, against the urging force of the torsion spring 23, in a rotation direction of a side where first the lock claw 22a is disengaged from the first lock hole 11i or the like. Thereby, the lock of the movement of the upper rail 12 with respect to the lower rail 11 is released. Therefore, the upper rail 12 is slidable in the frontward or rearward direction with respect to the lower rail 11. In this case, the tip end of the second lock claw 25a of the second lock lever 25 slidingly comes in contact with the downward extending portion 11g.

Particularly, if the upper rail 12 reaches the predetermined position, which is the boundary portion between the front area and the rear area in response to the movement thereof in the rearward direction, the second lock lever 25 urged by the torsion spring 26 is rotated in a rotation direction of a side where the second lock claw 25a is inserted into the second lock hole 11j or the like. Thereby, the movement of the upper rail 12 is locked at the predetermined position.

In the state, if the upper rail 12 is moved in the frontward direction (return movement), the second lock lever 25 is guided (rotation guide), against the urging force of the torsion spring 26, by the inclined portion 25b such that the second lock claw 25a is disengaged from the second look hole 11j or the like. In other words, the upper rail 12 can be moved in the frontward direction without operating the second releasing handle 7. In addition, in a state where the movement of the upper rail 12 is locked at the predetermined position, if the operation of the first releasing handle 6 is released, the tip end of the first lock claw 22a of the first lock lever 22 urged by the torsion spring 23 abuts on the downward extending portion 11g. In other words, the first lock claw 22a is unable to be inserted into the first lock hole 11i. However, immediately after the movement of the upper rail 12 in the frontward direction starts, the first lock claw 22a is inserted into the first lock hole 11i or the like. Thereby, even if the upper rail 12 tries to move in the frontward direction by the influence of the external force, it is possible that the movement of the upper rail 12 is immediately locked by the first lock mechanism L1 (first lock lever 22 or the like). In this case, the relative position between the lower rail 11 and the upper rail 12 is at the rearmost end of the front area.

In a state where the movement of the upper rail 12 is locked at the predetermined position by the second lock mechanism L2 (second lock lever 25 and the like), if the second releasing handle 7 is operated, the second lock lever 25 is rotated, against the urging force of the torsion spring 26, in a rotation direction of a side where the second lock claw 25a is disengaged from the second lock hole 11j or the like. Thereby, the lock of the movement of the upper rail 12 with respect to the lower rail 11 is released. Therefore, the upper rail 12 is slidable in the frontward or rearward direction with respect to the lower rail 11.

In the case where the upper rail 12 is moved in the frontward direction, the movement of the upper rail 12 is immediately locked, by the first lock lever 22 urged by the torsion spring 23, at the rearmost end of the front area, as described above. Meanwhile, in the case where the upper rail 12 is moved in the rearward direction, the tip end of the first lock claw 22a of the first lock lever 22 slidingly comes in contact with the downward extending portion 11g until reaching the rear area. If the upper rail 12 reaches the rear area, the first lock lever 22 urged by the torsion spring 23 is rotated in a rotation direction of a side where the first lock claw 22a is inserted into the first lock hole 11i or the like. Thereby, the movement of the upper rail 12 is locked at the position (a frontmost end of the rear area). In this state, if operation of the second releasing handle 7 is released, the tip end of the second lock claw 25a of the second lock lever 25 urged by the torsion spring 26 abuts on the downward extending portion 11g. In other words, the second lock claw 25a is unable to be inserted into the second lock hole 11j.

In a state where the movement of the upper rail 12 is locked at the frontmost end of the rear area by the first lock mechanism L1 (first lock lever 22 and the like), if the first releasing handle 6 is operated, the lock of the movement of the upper rail 12 with respect to the lower rail 11 is released according to the above-described aspect. Therefore, the upper rail 12 is slidable in the frontward and rearward direction with respect to the lower rail 11. Furthermore, in the case where the upper rail 12 is moved in the rearward direction, a front-rear positional adjustment of the upper rail 12 (seat 2) in the rear area can be performed. At this time, the tip end of the second lock claw 25a of the second lock lever 25 slidingly comes in contact with the downward extending portion 11g. Meanwhile, in the case where the upper rail 12 is moved in the frontward direction, the front-rear positional adjustment of the upper rail 12 (seat 2) in the front area can be performed. At this time, in response to the second lock claw reaching the second lock hole 11j, the second lock claw 25a, of which the tip end slidingly comes in contact with the downward extending portion 11g, may advance into the second lock hole 11j. However, according to the above-described aspect, the tip end thereof is immediately disengaged from the second lock hole 11j through being guided by the inclined portion 25b, and then slidingly coming in contact with the downward extending portion 11g again.

Furthermore, in a state where the movement of the upper rail 12 is locked at the predetermined position by the second lock mechanism L2, at least if the first releasing handle 6 is operated, the front-rear positional adjustment of the upper rail 12 in the front area can be performed directly. Meanwhile, in a state where the movement of the upper rail 12 is locked at the predetermined position by the second lock mechanism L2, if the first and second releasing handle 6, 7 are operated together, the front-rear positional adjustment of the upper rail 12 in the rear area can be performed directly.

As described above in detail, according to the embodiment, following effects can be obtained.

(1) According to the embodiment, in a state where the lock of the movement of the upper rail 12 with respect to the lower rail 11 by the first lock mechanism L1 is released, if the upper rail 12 is moved from the front area to the rear area, the movement of the upper rail 12 is certainly locked at the predetermined position, namely the boundary portion, by the second lock mechanism L2. Therefore, it is possible to allow a user, who performs the positional adjustment of the upper rail 12 (seat 2), or the like, to recognize the change of the area. In addition, in the case where the upper rail 12 is moved to the rear area, the engagement between the second lock lever 25 and the second lock hole 11j may be released through inputting the operation force for releasing to the second lock lever 25 by operating the second releasing handle 7. On the other hand, in the case where the upper rail 12 is moved toward the original area (front area), the engagement between the second lock lever 25 and the second lock hole 11j may be released through guiding the second lock lever 25 by the inclined portion 25b in response to the movement of the upper rail 12. As described above, in the usage form where the change of the area does not occur practically, for example, since it is possible to release the second lock lever 25 without operating the second releasing handle 7, it is possible to improve the operationality.

(2) According to the embodiment, it is possible to allow a user, who moves the upper rail 12 (seat 2) from the first row to the second row of the rear-seat compartment to recognize the change of the area between the front area and the rear area.

(3) According to the embodiment, the first lock mechanism L1 includes the first lock hole 11i which is continuously formed, in the front-rear direction, on a part of the lower rail 11 of the front area and rear area and the first lock lever 22 which has the first lock claw 22a and is rotatably connected with the upper rail 12. The first lock mechanism L1 locks the movement of the upper rail 12 with respect to the lower rail 11 by making the first lock claw 22a inserted into the first lock hole 11i. Meanwhile, the second lock mechanism L2 includes the second lock hole 11j which is formed on the lower rail 11 at the predetermined position, namely the boundary portion between the front area and the rear area and the second lock lever 25 which has the second lock claw 25a and is rotatably connected with the upper rail 12. The second lock mechanism L2 locks the movement of the upper rail 12 with respect to the lower rail 11 by making the second lock claw 25a inserted into the second lock hole 11j. As described above, it is possible to employ the first lock mechanism L1 and the second lock mechanism L2 based on a structure of the same principle.

(4) According to the embodiment, since the first lock mechanism L1 and the second lock mechanism L2 are respectively disposed on the different sides of the lower rail 11 in the width direction, it is possible for the first lock claw 22a of the first lock mechanism L1 (first lock lever 22) to avoid engaging to the second lock hole of the second lock mechanism L2. Likewise, it is possible for the second lock claw 25a of the second lock mechanism L2 (second lock lever 25) to avoid engaging to the first lock hole 11i of the first lock mechanism L1. As described above, it is possible to suppress the erroneous operation of the first lock mechanism L1 or the second lock mechanism L2. Thereby, it is possible to improve the arrangement flexibility of the first lock mechanism L1 or the second lock mechanism L2, for example.

(5) According to the embodiment, the first lock claw 22a is molded so as to be unable to be inserted into the second lock hole 11j even if the first lock mechanism L1 and the second lock mechanism L2 are disposed on the same side of the lower rail 11 in the width direction. In other words, although the width of the first lock claw 22a in the front-rear direction is smaller than the open width of the second lock hole 11j in the front-rear direction, the first lock claw 22a is unable to be inserted into the second lock hole 11j because three of the first lock claws 22a are juxtaposed in a lateral direction. Likewise, the second lock claw 25a is molded so as to be unable to be inserted into the first lock hole 11i. In other words, since the width of the second lock claw 25a in the front-rear direction is set to be larger than the open width of the first lock hole 11i in the front-rear direction, the second lock claw 25a is unable to be inserted into the first lock hole 11i. As described above, even if the first lock mechanism L1 and the second lock mechanism L2 are disposed on the same side of the lower rail 11 in the width direction, it is possible to suppress the erroneous operation of the first lock mechanism L1 or the second lock mechanism L2.

Alternatively, if, to standardize both lower rails 11 paired in the width direction, the first and second lock holes 11i, 11j are formed on both sides of each lower rail 11 in the width direction, it is possible to suppress the erroneous operation of the first lock mechanism L1 or the second lock mechanism L2 and to further simplify the parts management.

(6) According to the embodiment, it is possible to guide the second lock claw 25a by the inclined portion 25b having a very simple structure so as to be disengaged from the second lock hole 11j.

(7) According to the embodiment, it is possible to restrict the movement of the upper rail 12 in one direction (that is, the movement in the rearward direction) in a state where the movement of the upper rail 12 is locked by the second lock mechanism L2.

(8) According to the embodiment, since the first and second lock mechanisms L1, L2 are respectively provided with the first and second releasing handle 6, 7, it is possible to conduct the operation in a sequential flow. Thereby, the operationality can be improved.

(9) According to the embodiment, it is possible for the first lock mechanism L1 to set whether or not to lock the movement of the upper rail 12 (seat 2) corresponding to the disposition setting of the first lock hole 11i, without being influenced by the position or attitude of the seat 2 (for example, the forward inclination of a seat back or the tip up movement of a seat cushion). Likewise, it is also possible for the second lock mechanism L2 to set whether or not to lock the movement of the upper rail 12 (seat 2) corresponding to the disposition setting of the second lock hole 11j, without being influenced by the position or attitude of the seat 2.

The embodiment may be modified as follow.

In the embodiment, the number of first lock claws 22a of the first lock lever 22 is arbitrary. Also, the number of second lock claws 25a of the second lock lever 25 is arbitrary.

In the embodiment, the width of the first lock claw 22a in the front-rear direction is arbitrary as long as being able to be inserted into the first lock hole 11i. Also, the width of the second lock claw 25a in the front-rear direction is arbitrary if being able to be inserted into the second lock hole 11j.

In the embodiment, the first and second lock mechanisms L1, L2 are respectively provided with the first and second releasing handles 6, 7. However, the release operation of the first and second lock mechanisms L1, L2 may be performed by a common releasing handle. In this case, the release timing of the first and second lock mechanisms L1, L2 may be synchronized or different with each other.

In the embodiment, the first and second lock mechanisms L1, L2 may be disposed on the same side of the lower rail 11 in the width direction. Even modified in this way, the first lock claw 22a and the second lock claw 25a are molded so as to be unable to be inserted into the second lock hole 11j and the first lock hole 11i, respectively. Thereby, it is possible to suppress the erroneous operation of the first and second lock mechanisms L1, L2.

In the embodiment, in a state where the lock of the movement of the upper rail 12 with respect to the lower rail 11 by the first lock mechanism L1 is released, the second lock mechanism L2 may lock the movement of the upper rail 12 at the predetermined position when the upper rail 12 is moved from the rear area to the front area.

In the embodiment, instead of the second lock mechanism L2 (second lock hole 11j, second lock lever 25 and the like), a stopper mechanism which is formed of an appropriate stopper portion provided in the lower rail 11 and an appropriate stopper member provided movably in the upper rail 12 may be employed. In other words, the lock or release of the movement of the upper rail 12 with respect to the lower rail 11 does not always have to be the insertion or disengagement of the stopper member with respect to the stopper portion having a hole shape. For example, a pair of front and rear projecting pieces is formed on the lower rail 11. Then, the projecting length of both projecting pieces is set differently each other. Thereby, when the upper rail 12 is moved in one direction, the movement is allowed, within a movable range of the stopper member, by the projection piece on a relatively near side and the movement is locked by the projection piece on a relatively far side. In this case, a groove shape, which is relatively recessed with respect to these projecting pieces and where each of both projecting pieces is put into, becomes the stopper portion. Point is that the movement of the upper rail 12 toward the predetermined position in the one direction may be able to be locked by engaging the stopper member to the stopper portion at a predetermined position. Additionally, the stopper mechanism may has a guide portion which guides the stopper member in response to the movement of the upper rail 12, which is locked at the predetermined position, in an opposite direction, so as to release the engagement with the stopper portion.

In the embodiment, the lock position of the movement of the upper rail 12 with respect to the lower rail 11 by the second lock mechanism L2 may be multiple. In this case, if the position of the upper rail 12 with respect to the lower rail 11 is divided into three or more areas, for example, the movement of the upper rail 12 may be locked at each boundary portion between the adjacent areas.

In the embodiment, a constitution where one lower rail 11 and one upper rail 12 are provided with respect to the seat 2 may be employed, or a constitution where three or more lower rails 11 and three or more upper rails 12 are provided may be employed as well.

This disclosure may be applied to a seat which is slidable between a seating area and a non-seating area (luggage compartment area, for example), Also, when moving the seat from the seating area to the non-seating area, the seat may be temporarily stopped, by a stopper mechanism, at the boundary position between the seating area and the non-seating area in order to allow a user to recognize the change of the area. In this case, it is possible to easily conform to the legal regulation (specifically, the legal regulation which limits the seat movement amounts in a seating state in order to secure the safety of the seat belt, with respect to a vehicle of which a seat belt anchor is attached to its body) which limits the seat movement amounts in its service region.

Alternatively, when a seat is moved in one direction in a luggage compartment area, the seat may be temporarily stopped, by a stopper mechanism, at a predetermined intermediate portion of the luggage compartment area. In this case, by moving the seat in the one direction further than the predetermined intermediate portion, it is possible to release the stopper member without operating an operation member. Thereby, the luggage compartment area can be simply readjusted (expansion or reduction).

This disclosure may be applied to a seat which is slidable between an action area where an air-bag device can function and a non-action area where the air-bag cannot function. When moving the seat from either one of the action area or non-action area to the other one, the seat may be temporarily stopped, by a stopper mechanism, at the boundary position between the action area and the non-action area in order to allow a user to recognize the change of the area.

Next, technical ideas that can be grasped from the embodiment or another example will be appended.

(A) A vehicle seat slide apparatus includes: a lower rail which is fixed to a vehicle floor; an upper rail which is fixed to a seat and slidably connected with the lower rail, and its relative position with respect to the lower rail is divided into two different areas of a first area and a second area; a lock mechanism which selectively locks the movement of the upper rail with respect to the lower rail at an arbitrary position of the first area or the second area; a stopper mechanism which has a stopper portion provided in the lower rail and a stopper member movably provided in the upper rail, and locks the movement of the upper rail from the first area toward the second area by making the stopper member and the stopper portion engage with each other at a predetermined position, namely a boundary portion between the first area and the second area; an operation member which allows the movement of the upper rail, which is locked at the predetermined position, to the second area by inputting an operation force for releasing to the stopper member; and a guide portion which is formed on the stopper member, and guides the stopper member so as to release the engagement between the stopper member and the stopper portion in response to the movement of the upper rail, which is locked at the predetermined position, to the first area. According to the configuration, in a state where the lock of the movement of the upper rail with respect to the lower rail by the lock mechanism is released, if the upper rail is moved from the first area toward the second area, the movement of the upper rail is certainly locked at the predetermined position, namely the boundary portion, by the stopper mechanism. Therefore, it is possible to allow a user, who performs a positional adjustment of the upper rail (seat) to recognize the change of the area. In addition, in the case where the upper rail is moved to the second area further than the predetermined position, the engagement between the stopper member and the stopper portion may be released through inputting an operation force for releasing to the stopper member by operating the operation member. On the other hand, in the case where the upper rail is moved to an original area (first area), the engagement between the stopper member and the stopper portion may be released through guiding the stopper member by the guide portion in response to the movement of the upper rail. As described above, in the usage form where the change of the area does not occur practically, since it is possible to release the stopper member without, for example, operating the operation member, it is possible to improve the operationality.

Therefore, aspects of this disclosure are further described below.

According to an aspect of this disclosure, there is provided a vehicle seat slide apparatus including: a lower rail which is fixed to a vehicle floor; an upper rail which is fixed to a seat and slidably connected with the lower rail; a lock mechanism that selectively locks a movement of the upper rail at an arbitrary position of the upper rail with respect to the lower rail; a stopper mechanism that has a stopper portion provided in the lower rail and a stopper member movably provided in the upper rail, and locks the movement of the upper rail toward a predetermined position in one direction by making the stopper member and the stopper portion engage with each other at the predetermined position of the upper rail with respect to the lower rail; an operation member which allows the movement of the upper rail, which is locked at the predetermined position, in the one direction by inputting an operation force for releasing to the stopper member; and a guide portion which is formed on the stopper member and guides the stopper member so as to release the engagement between the stopper member and the stopper portion in response to the movement of the upper rail, which is locked at the predetermined position, in an opposite direction of the one direction.

According to the configuration, in a state where the lock of the movement of the upper rail with respect to the lower rail by the lock mechanism is released, if the upper rail is moved toward the predetermined position in the one direction, the movement of the upper rail is certainly locked at the predetermined position by the stopper mechanism. Therefore, it is possible to allow a user, who performs a positional adjustment of the upper rail (seat), or the like, to recognize, for example, the change of the area. In addition, in the case where the upper rail is moved in the one direction further than the predetermined position, the engagement between the stopper member and the stopper portion may be released through inputting the operation force for releasing to the stopper member by operating the operation member. On the other hand, in the case where the upper rail is moved in the opposite direction, the engagement between the stopper member and the stopper portion may be released through guiding the stopper member by the guide portion in response to the movement of the upper rail. As described above, for example, in the usage form where the change of the area does not occur practically, since it is possible to release the stopper member without operating the operation member, it is possible to improve the operationality.

In addition to the configuration of the above vehicle seat slide apparatus, the position of the upper rail with respect to the lower rail is divided into a front area and a rear area where the front area is a front-rear positional adjustment area of a first-row rear seat and the rear area is a front-rear positional adjustment area of a second-row rear seat, and the predetermined position is a boundary portion between the front area and the rear area.

According to the configuration, it is possible to allow a user, who moves the upper rail (seat) from the first row to the second row of the rear-seat compartment, for example, to recognize the change of the area between the front area and the rear area.

In addition to the configuration of the above vehicle seat slide apparatus, the lock mechanism is a first lock mechanism that includes a first lock hole which is continuously formed on the lower rail in a front-rear direction and a first lock lever which has a first lock claw and is rotatably connected with the upper rail, and that locks the movement of the upper rail with respect to the lower rail by making the first lock claw inserted into the first lock hole, and the stopper mechanism is a second lock mechanism that has a second lock hole, as a stopper portion, which is formed on the lower rail and a second lock lever, as a stopper member, which has a second lock claw and is rotatably connected with the upper rail, and that locks the movement of the upper rail with respect to the lower rail by making the second lock claw inserted into the second lock hole.

According to the configuration, it is possible for the lock mechanism and the stopper mechanism to employ a lock mechanism based on a structure of the same principle.

In addition to the configuration of the above vehicle seat slide apparatus, the first lock mechanism and the second lock mechanism are respectively disposed on the different sides of the lower rail in a width direction.

According to the configuration, it is possible for the first lock claw of the first lock mechanism to avoid engaging to the second lock hole of the second lock mechanism, for example. Likewise, it is possible for the second lock claw of the second lock mechanism to avoid engaging to the first lock hole of the first lock mechanism. As described above, it is possible to suppress the erroneous operation of the first lock mechanism or the second lock mechanism. Thereby, it is possible to improve arrangement flexibility of the first lock mechanism and the second lock mechanism, for example.

In addition to the configuration of the above vehicle seat slide apparatus, the first lock claw is molded to be unable to be inserted into the second lock hole, and the second lock claw is molded to be unable to be inserted into the first lock hole.

According to the configuration, even if the first lock mechanism and the second lock mechanism are disposed on the same side of the lower rail in the width direction, it is possible to suppress the erroneous operation of the first lock mechanism or the second lock mechanism.

In addition to the configuration of the above vehicle seat slide apparatus, the guide portion is an inclined portion which is formed on the second lock claw and guides the second lock claw so as to be disengaged from the second lock hole through being pressed by the second lock hole in response to the movement of the upper rail in the opposite direction.

According to the configuration, it is possible to adopt the inclined portion having a very simple structure, as the guide portion.

This disclosure can provide a vehicle seat slide apparatus capable of allowing a user, who performs a positional adjustment of an upper rail (seat), or the like, to recognize, for example, the change of an area while suppressing the deterioration of operationality.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle seat slide apparatus comprising:
a lower rail configured to be fixed to a vehicle floor;
an upper rail configured to be fixed to a seat and slidably connected with the lower rail;
a lock mechanism that selectively locks a movement of the upper rail at an arbitrary position of the upper rail with respect to the lower rail;
a stopper mechanism that has a stopper portion provided in the lower rail and a stopper member movably provided in the upper rail, and locks the movement of the upper rail toward a predetermined position in one direction by making the stopper member and the stopper portion engage with each other at the predetermined position of the upper rail with respect to the lower rail;
an operation member that allows the movement of the upper rail, which is locked at the predetermined position, in the one direction by inputting an operation force for releasing to the stopper member; and
a guide portion that is formed on the stopper member, and guides the stopper member so as to release the engagement between the stopper member and the stopper portion in response to the movement of the upper rail, which is locked at the predetermined position, in an opposite direction of the one direction,
wherein the lock mechanism is a first lock mechanism that includes a first lock hole which is continuously formed on the lower rail in a front-rear direction and a first lock lever which has a first lock claw and is rotatably connected with the upper rail, and that locks the movement of the upper rail with respect to the lower rail by making the first lock claw inserted into the first lock hole,
wherein the stopper mechanism is a second lock mechanism that has a second lock hole, as the stopper portion, which is formed on the lower rail and a second lock lever, as the stopper member, which has a second lock claw and is rotatably connected with the upper rail, and that locks the movement of the upper rail with respect to the lower rail by making the second lock claw inserted into the second lock hole,
wherein the first lock claw is molded to be unable to be inserted into the second lock hole, and
wherein the second lock claw is molded to be unable to be inserted into the first lock hole.

2. The vehicle seat slide apparatus according to claim 1,
wherein the position of the upper rail with respect to the lower rail is divided into a front area and a rear area where the front area is a front-rear positional adjustment area of a first-row rear seat and the rear area is a front-rear positional adjustment area of a second-row rear seat, and
wherein the predetermined position is a boundary portion between the front area and the rear area.

3. The vehicle seat slide apparatus according to claim 1,
wherein the first lock mechanism and the second lock mechanism are respectively disposed on different sides of the lower rail in a width direction.

4. The vehicle seat slide apparatus according to claim 1,
wherein the guide portion is an inclined portion that is formed on the second lock claw and guides the second lock claw so as to be disengaged from the second lock hole through being pressed by the second lock hole in response to the movement of the upper rail in the opposite direction.

* * * * *